US008589093B2

(12) United States Patent
Baran et al.

(10) Patent No.: US 8,589,093 B2
(45) Date of Patent: Nov. 19, 2013

(54) HOME NETWORK SYSTEM AUGMENTATION WITH REMOTE GUIDANCE AND LOCAL SET UP AND MONITORING

(75) Inventors: Paul Baran, Atherton, CA (US); Eugene R. Wilson, San Jose, CA (US); Robert S. Parnell, San Jose, CA (US); Hugo Haselhuhn, Paso Robles, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 0 days.

(21) Appl. No.: 13/554,945

(22) Filed: Aug. 17, 2012

(65) Prior Publication Data

US 2012/0307879 A1    Dec. 6, 2012

Related U.S. Application Data

(62) Division of application No. 12/028,738, filed on Feb. 8, 208, now Pat. No. 8,489,344.

(60) Provisional application No. 60/889,235, filed on Feb. 9, 2007.

(51) Int. Cl.
*G01R 15/00* (2006.01)

(52) U.S. Cl.
USPC .................................. 702/57; 702/60; 702/62

(58) Field of Classification Search
USPC ...................................................... 702/57–62
See application file for complete search history.

(56) References Cited

U.S. PATENT DOCUMENTS

| | | | |
|---|---|---|---|
| 6,961,668 B2 | 11/2005 | Bodin et al. | |
| 6,972,677 B2 * | 12/2005 | Coulthard | 340/531 |
| 7,076,378 B1 * | 7/2006 | Huebner | 702/69 |
| 7,136,270 B2 | 11/2006 | Liebenow | |
| 7,209,034 B2 | 4/2007 | Bodin | |
| 7,298,691 B1 | 11/2007 | Yonge, III et al. | |
| 2003/0040819 A1 | 2/2003 | Gonzales et al. | |
| 2003/0056737 A1 | 3/2003 | Hyde | |

OTHER PUBLICATIONS

Non-Final Office Action for U.S. Appl. No. 12/028,738, Mailed Jan. 19, 2012., 9 pages.
Non-Final Office Action for U.S. Appl. No. 12/028,738, Mailed Sep. 22, 2011, 6 pages.
Notice of Allowance for U.S. Appl. No. 121028,738, Mailed Mar. 14, 2013., 7 pages.
"HomePlug AV White. Paper", *HomePlug Powerline Alliance, Inc.* 2005.
Papaleonidopoulos, I. , et al., "Branched-Bus HF Power-Delay-Profile Approach of Indoor PLC Channels", Int'l Symposium on Power Line Communications and its Applications, Apr. 6-8, 2005, p. 147-151.

\* cited by examiner

*Primary Examiner* — Sujoy Kundu
(74) *Attorney, Agent, or Firm* — Blakely, Sokoloff, Taylor & Zafman, LLP

(57) ABSTRACT

A network including powerline adapters ("PLAs") of the HomePlug Alliance variety or similar implementations such as the European in Opera standard provides for diagnostic capability and software enhanced powerline adapters. The diagnostic capability includes collecting network performance data and either analyzing or forwarding data for analysis. In addition, mechanical design for the PLA with an isolating filter provides for secure mounting while blocking access to a second wall outlet of a duplex unit.

8 Claims, 9 Drawing Sheets

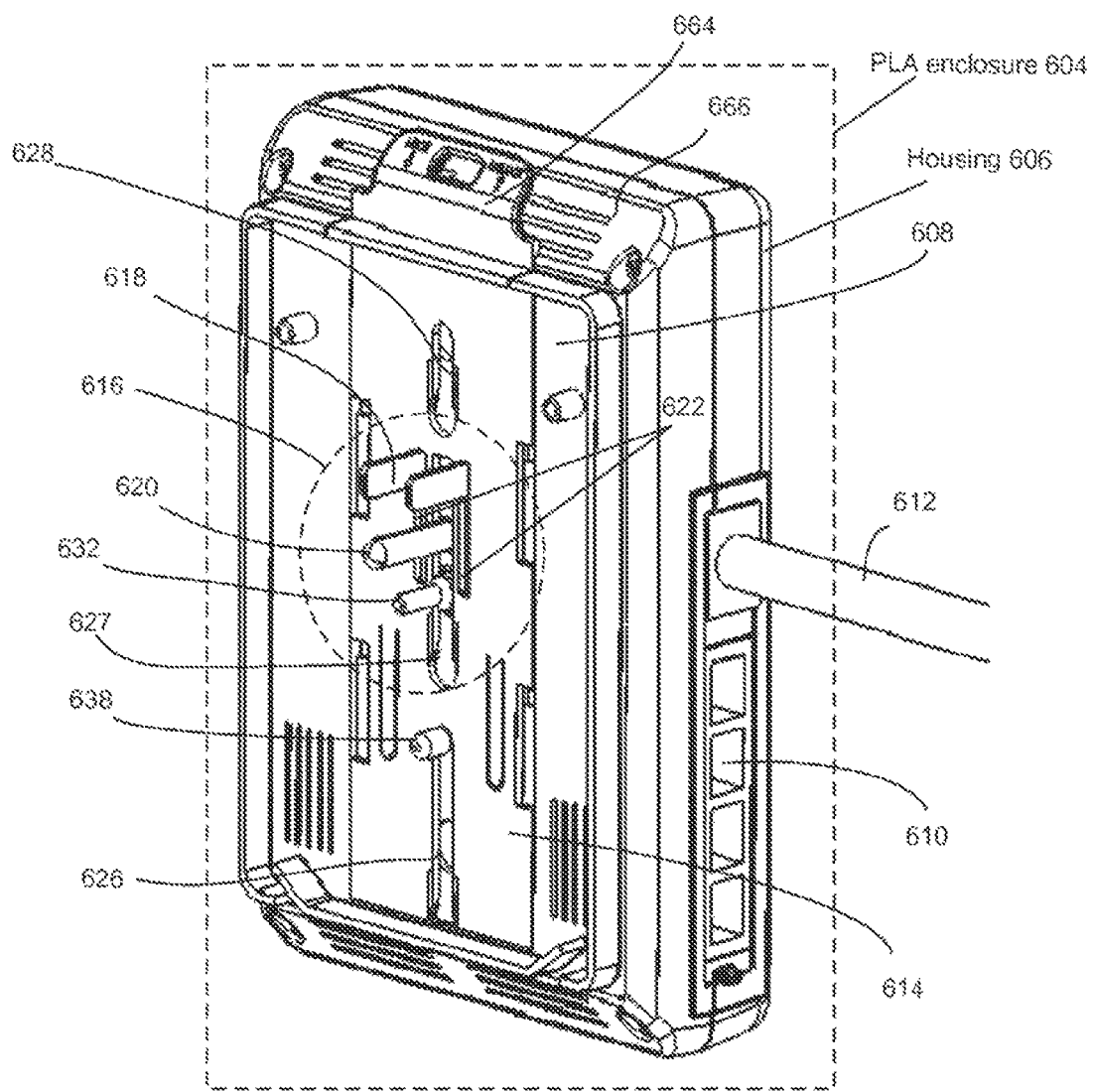

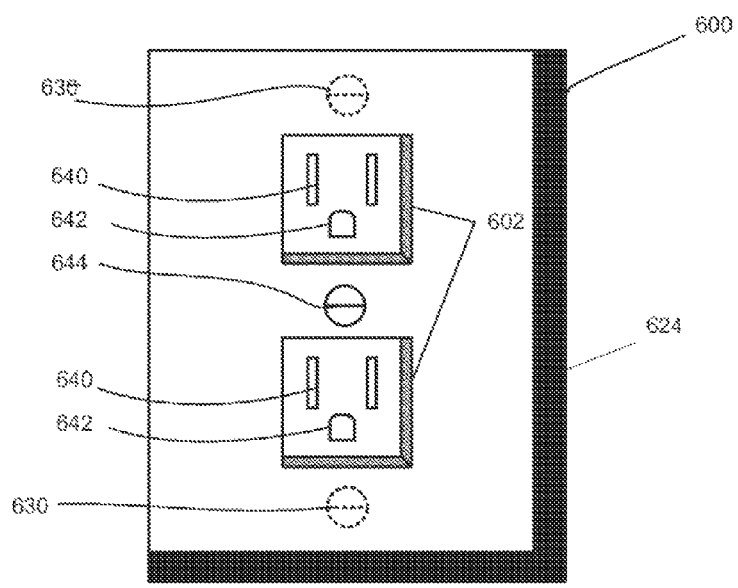
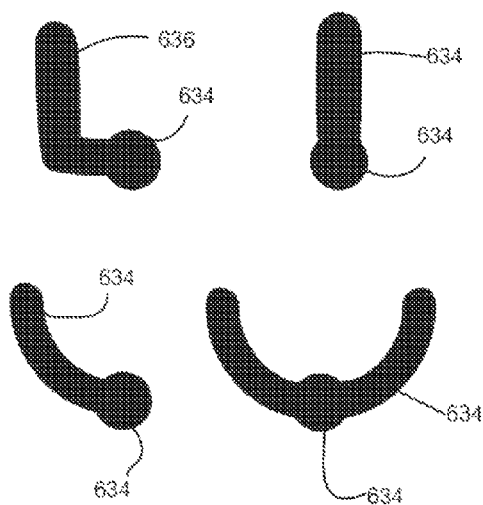
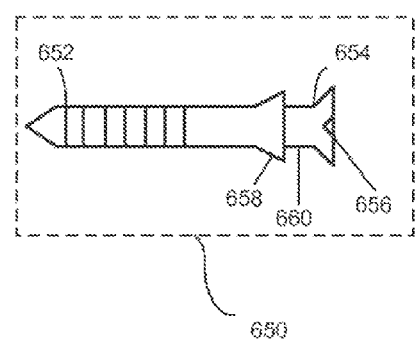

HOME NETWORK SYSTEM AUGMENTATION WITH REMOTE GUIDANCE AND LOCAL SET UP AND MONITORING

RELATED APPLICATION

This application claims priority to U.S. patent application Ser. No. 12/028,738 filed Feb. 8, 2008, and entitled "HOME NETWORK SYSTEM AUGMENTATION WITH REMOTE GUIDANCE AND LOCAL SET UP AND MONITORING", which is a Non-Provisional of Application No. 60/889,235 filed Feb. 9, 2007 and entitled "METHODS AND APPARATUS RELATED TO POWER LINE ADAPTERS AND DIGITAL HOME COMMUNICATIONS NETWORKS".

BACKGROUND OF THE INVENTION

This application relates to a network including powerline adapters ("PLAs") of the HomePlug Alliance variety or similar implementations. The technology disclosed provides diagnostic capability and software enhanced powerline adapters. The diagnostic capability includes collecting network performance data and either analyzing or forwarding data for analysis and providing corrective feedback information. In addition, mechanical design for the PLA with an isolating filter provides secure mounting and protective access while blocking plug in access to the second wall outlet of a duplex electric socket.

There are a variety of technologies that home, small business and building owners can use to provide users with network access. Wired technologies include coaxial cable and CAT 5 network wiring. Wireless technologies include the IEEE 802.11 family of standards and adapters to cellular networks. A relatively new contender for network access within a building is attaching powerline adapters to wall outlets and power lines. With PLAs, existing building wiring can be used to distribute encrypted network traffic in much the same way that wireless access points are used.

There are at least three incompatible standards for PLAs. The leading standard in the United States is sponsored by the HomePlug Alliance, on the Internet at www.HomePlug.org. The mission of the Alliance is to enable and promote rapid availability, adoption and implementation of cost effective, interoperable and standards-based home powerline networks and products. The PLAs described herein are of the HomePlug AV variety unless otherwise noted, but could be implemented to comply with other standards. Underlying these standards is a physical layer that sends and receives digital information as orthogonal frequency division multiplexed ("OFDM") symbols in the frequency range of 0.6 to 30 megahertz. There are about 1500 separate channels in this frequency range, not all of which are available for data transmission. Some are reserved for housekeeping, for error correction and some not used to avoid transmitting in the radio amateur band. The raw signaling rate for the HomePlug AV specification is 200 megabits per second. This assumes a very high signal-to-noise ratio transmission path able to support transmission of 10 bits per tone. With forward error correction ("FEC") and other overhead requirements the maximum data rate is closer to 150 megabits per second. As these powerline adapters use 100 Mbps Ethernet connections to PCs, the maximum data rate between these PLAs is limited to 100 megabits per second. In practice a reasonable expectation for actual performance in most homes and other buildings (collectively "the home") with a clean circuit is on the order of 30 to 50 Mbps. Even in a relatively noisy installation, 10 Mbps should be achievable over existing wiring.

There have been several versions of the HomePlug standard over time starting with 14 Mbps claimed, then a few years later, 85 Mbps, and most recently the HomePlug AV claimed to operate at 200 Mbps. The generations have different features and do not work well together. The HomePlug units follow a consistent protocol of avoiding collisions across generations of HomePlug units, but international suppliers that use totally different collision avoidance strategies have sold units in the U.S. which are essentially a noise source to those using the HomePlug AV standard, and vice versa. Thus, a user may buy an advertised unit without realizing that it is not compatible with other units already being used in the home. Incompatible units will not interact with one other and incompatible collision avoidance strategies reduce performance of the entire network. It is useful to identify incompatible units as sources of noise and eliminate the noise.

Every home is different. Two common problems found in homes are signal attenuation by devices connected near the powerline adapter, such as those using switching power supplies that generate RF noise in the spectrum of interest and use capacitors to limit RF noise, and noise from devices such as vacuum cleaners, microwave ovens and hair driers that conflicts with the OFDM signal spectrum. Resolution of the source of noise problems in a powerline installation is made more difficult by noise coming from devices that are turned on and off such as hair dryers, vacuum cleaners or many different electrical appliances. Intermittent problems are difficult to diagnose and correct.

Another group of issues relates to use of multiple circuit breaker boxes in larger and newer homes. These cause significant signal reduction. While these difficulties can be resolved by a skilled technician, troubleshooting a powerline communications system is often beyond the capability and/or patience of the average home network user. As a result, in many home network sales today, technicians are employed to set up systems initially and resolve problems. But, the cost of "setup and repair" services is relatively high, especially compared to the network unit costs. The typical cost of a "truck roll" in 2007 is on the order of $200.

Given these issues, a need exists for an automated remote diagnostic capability for measuring and improving the performance of a home installed powerline adapter network and to minimize home visits by technicians. Better, more easily configured, and more resilient systems may result.

SUMMARY OF THE INVENTION

This application relates to a network including powerline adapters ("PLAs") of the HomePlug Alliance variety or similar implementations. The technology disclosed provides remote diagnostic capability and software enhanced powerline adapters. The diagnostic capability includes collecting network performance data and either analyzing or forwarding data for analysis. In addition, mechanical design for the PLA with an isolating filter provides for secure mounting while blocking access to a second wall outlet of a duplex unit. Particular aspects of the present invention are described in the claims, specification and drawings.

BRIEF DESCRIPTION OF THE DRAWINGS

FIG. 6 is a rear isometric view of an embodiment with a sliding capture plate in a use orientation for semi-permanent mounting of the device.

FIG. 6B illustrates parts of an electrical outlet within an opening of a wall;

FIG. 6C illustrates a number of examples of different mounting slots;

FIG. 6D is a side view of a replacement cover plate mounting screw;

DETAILED DESCRIPTION

Figure 1:
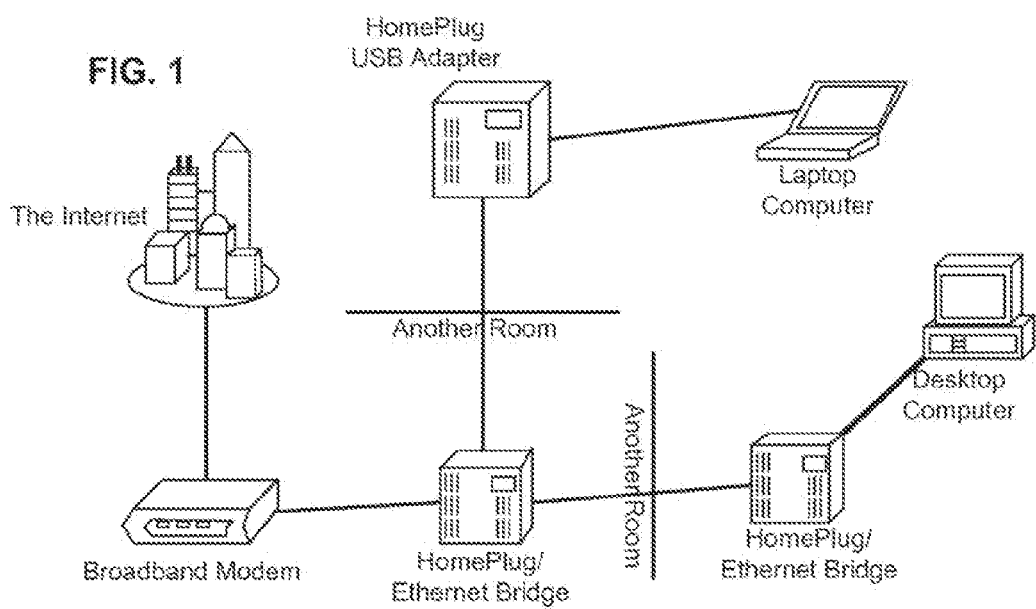
FIG. 1 depicts an environment in which PLAs are useful.

The following detailed description is made with reference to the figures. Preferred embodiments are described to illustrate the present invention, not to limit its scope, which is defined by the claims. Those of ordinary skill in the art will recognize a variety of equivalent variations on the description that follows.

We disclose technology that permits troublesome issues to be remotely spotted and corrected, thereby allowing power-line adapters to be used in places where they would not otherwise be considered. There are many side benefits to remote troubleshooting. For example, many home communications devices are purchased and returned to the stores where they were bought because of the difficulty in getting the units to perform as intended. When networks perform reliably and at intended speeds, such product returns are minimized.

One attraction of powerline adapters is that every electrical power outlet in a home or office is a potential broadband connection. It has been estimated that there are about three cable outlets, four telephone outlets and more than 50 electrical outlets in a home. Using the electrical outlets for signal distribution increases the reach of systems that can distribute VOIP, data, and digital TV.

Diagnostic Issues

Diagnosing a network is a complex task, typically left to trained experts. Diagnostics usually implies finding the cause of a fault, fixing the fault, and having the system work thereafter. Diagnosis of a powerline analog transmission network must deal with shades of gray issues and not necessarily faults, as they are degree of performance issues. Because some problems are intermittent, it is desirable for a system to be continuously monitored, so any new imperfections can be detected and addressed as rapidly as possible.

Continuous monitoring allows rapid diagnosis and advice generation. Even when a network seems to be working well to the user, the remote diagnostic center can be on the lookout for ways to make it work better. The remote diagnostic center can capture intermittent sources of interference and compile performance data over time. This allows improved diagnosis based on past experience. For a sophisticated user, data compilation and automated diagnosis software can be delivered to desktop computer, instead of relying on a remote center.

Noise and attenuation are the two primary causes of poor performance in a power line network. A common cause of poor performance is plugging the PLA into the same electrical wall socket as a computer or similar device with an electronic power supply. The conductive line noise filter in a computer and similar devices tends to short out radio frequency ("RF") signals from PLA units. PLA manufacturers generally warn users in their instruction manuals to avoid plugging computers or power strips containing surge protectors into the same wall socket as the PLA. Computers and surge protectors tend to have large capacitors across the power line. The low impedance of these capacitors in the frequency range of interest can effectively short-circuit the RF signals from the PLA. Since PLA units typically include an Ethernet connector, it is highly likely that this will be positioned near a computer, peripheral device or power strip. Even power strips with surge protectors include capacitors across the line that can cause significant loss of performance for PLA signals. While the user is advised not to connect their computer to the same power socket as the PLA and to use some other socket, these words are not often regarded very seriously. In older homes the "other" wall socket tends to be on the opposite side of the room, and often further away than the line cord of the computer or power strip will reach. Few users tolerate wires strung across the room when there is an unused socket in a duplex wall outlet. As a result, it is understandable that many users will observe this instruction in the PLA manual about as often as they observe the instruction in television set manuals to unplug their TV sets during a lightning storm to prevent possible lightning damage. Consequentially, there is often a source of signal attenuation present that the user ignores, because they find it so hard to believe that connecting two outlets on the same circuit only a few meters apart could result in different performance.

Noise is the other primary cause for poor performance. The table below, from Canete et al., "Broadband modeling of indoor power-line channels", IEEE Trans. on Consumer Electronics, Vol. 48, No. 1, February 2002, p. 177, indicates the nature of some of the more common noise sources in a home.

| Noise Emission Levels, dBm at 1 kHz | Mean | Std. |
|---|---|---|
| Vacuum cleaner | −66.2 | 6.0 |
| Microwave oven | −69.2 | 10.3 |
| Hair Dryer | −72.0 | 8.2 |
| Light dimmer | −77.4 | 12.7 |
| M.O (oven mode) | −78.9 | 12.5 |
| Iron | −81.5 | 11.5 |
| Heater | −84.3 | 13.9 |
| Personal Computer | −87.9 | 7.2 |
| Washing Machine | −89.6 | 12.0 |
| TV | −90.1 | 6.6 |
| Refrigerator | −102.5 | 9.4 |
| Oven | −104.2 | 10.8 |
| Toaster | −106.8 | 8.5 |

From this table, it appears that 60 dBm of isolation will be effective against most noise sources. In one embodiment, this is the design point of the Isolator filter.

These inventors found a way to solve a long felt need to improve PLA network deployment. They observe the ratio between the sending and receiving channel capacity measurements at each node in the PLA network relative to the other nodes and uniquely identify the likely locations of noise sources. When the input and output data rates vastly differ, they believe that this implies that an electrical noise source is at or near the node in question. This is because a node sets the rates at which it will receive data. A low receive rate, relative to the transmission rate, which corresponds to low bit loading of OFDM tones or channels, is a likely indicator of a local noise source. Analysis software built into an enhanced PLA uses this observation for localizing and reporting the presence of a noise source.

Further diagnostic information can be developed by examining the spectrum in use. The "Tone Map" which is a part of the HomePlug AV Standard carries information about the number of bits that each OFDM tone can carry. Bit loading inversely correlates to the noise level present. Further information is obtained by using the recorded knowledge of the start and stop times for intermittent noise sources. Other causes of reduced channel capacity include the presence of incompatible PLA units and attenuation by multiple circuit breaker boxes. Mixing HomePlug AV compliant devices together with PLAs following different standards can be detected by observing the received Tone Maps. The transmitted spectra have different standards. The diagnostic plan searches for incompatible units.

Understanding the impact of multiple circuit breaker boxes in a home enhances diagnostic insight capabilities. The conventional wisdom is that when PLA signals traverse an electric revenue meter, the signals will be attenuated by .about.20+dB. Thus, two electric meters in series, as in the case of signals going from one house to another, would be expected to produce the loss of about 40+dB. Testing by these inventors and their colleagues has found negligible loss in the 0.6 to 30 MHz band when signals pass through electric meters. A batch of electric meters of different vintages was tested. While a major loss in excess of 20 dB was observed in the field, this loss was caused not by the meter, but by combining losses within the circuit breaker box adjacent to the meter.

Losses in the circuit breaker box are best understood by viewing the breaker box as a junction of many different circuits. A signal arriving from any circuit must be divided by the equivalent impedance of the other connected circuits. For simplicity of analysis, each circuit is assumed to be electrically identical and offer the same impedance. So multiple circuits effectively create a voltage divider for the incoming signal. A signal coming in on any particular circuit is split into multiple branches at the circuit breaker box. If, for example, each of the circuits is assumed to have an impedance of 50 ohms, the incoming signal would be divided by "n" circuits. The resulting signal loss is 20 Log n, where n is the number circuits. If n were 15 (circuit breakers), then the parallel resistance would be about $\frac{1}{15}$th of 50 ohms or 3.333 ohms. Since we assumed a series resistance of 50 ohms, the output voltage is reduced by a factor of 3.33/53.33=0.062 or—about 24 dB.

The assumption of 50 ohms is a simplification for tutorial purposes only. In the real world, the impedance of each circuit is different and is a frequency dependent complex function. The point is that the greater the number of branch circuits, the greater the attenuation expected. Joining multiple circuit breakers in tandem exacerbates the splitting effect.

This simplified view offers insight as to why PLA works so well for small homes, but is less effective in larger ones. Larger houses tend to use multiple circuit breaker boxes, which cascade signal splitting. A more elaborate analysis, which stops short of articulating this insight, is found in Ioannis C. Papaleonidopoulos, Christakis A Ioannou, Constantinos G. Karagiannopoulos and Nickolas J. Theodorou, "Branched-Bus HF Power-Delay-Profile Approach of Indoor PLC Channels" 2005 International Symposium on Power Line Communications and its Applications, pp 147-51, 0-7803-8844-5/05. In this paper, attenuation as well as signal reflection and scatter were estimated for each wire and each termination, and the estimates compared with measured data. To achieve a precise estimation of the effect of various impairments, the transmission line length and impedance of the pieces of house wiring were input, as well as the distances to the pieces of wire in the house. Further, the loads connected to the wires were estimated. Additional issues with this paper include the difference between European two-wire and US three-wire systems, which correspond to European single phase power and US two-phase power. Moreover, the living space analyzed was relatively small in comparison to larger homes the United States.

The simplified signal distribution analysis suggested to these inventors is that placing an enhanced PLA "close" to a breaker box with a repeating capability could significantly improve overall performance. (The Papaleonidopoulos article does not mention or lead one to this conclusion.) By "close", we mean at or near the closest in distance available power outlet from the building's electric meter.

Device Including Data Collection and an Isolating Filter

In one embodiment, an enhanced PLA is able to operate with HomePlug AV PLAs from multiple manufacturers. In the following discussion, we use the shorthand designation "Uberbox" to refer to these enhanced PLAs. Each "Uberbox" has a number of capabilities beyond the usual PLA, including the capability to probe and report the transmission and reception capacity of each PLA on the network to every other PLA, or at least those "visible".

Alternatively, the Uberbox could establish connections to the visible PLAs and report the operating parameters established. Optionally, transmission rate reporting may be combined with an Isolator so that power from the wall outlet to which the Uberbox is attached can also be supplied to a noisy or low impedance device without noise or attenuation from the device significantly degrading the network. As a further option, the Uberbox may repeat packets to bridge segments of a physical power line medium to link nodes not otherwise visible to each other.

Viewing the entire network as a whole reveals different data rates among devices in the network. Nominal input and output rates can be obtained from general use PLAs they "see". The Uberbox does this and optionally records and stores measured data rates to and from every PLA on the network, as its view is that of a total system. As described, if a device's receive data rate is much lower than its transmit data rate, this strongly suggests a source of noise at or near the device, so the overall view of the Uberbox provides a rapid indication of problems anywhere in the network.

In one embodiment, the Uberbox contains resources to support a Linux implementation. With the Linux or other operating system, the Uberbox may support all levels of the ISO seven-layer architecture model, in contrast to standard PLAs which support only levels 1 and 2. Customization, field updating and alternative data translations can be supported by logic and resources running higher protocol levels, including downloading updated software.

The Uberbox also may or may not include an Isolator. The Isolator performs two functions. First, it decouples the effect of electronic devices containing front end capacitors, such as computers, power strips, etc., which short out or attenuate the transmission from the PLA via RF on power lines. Second, the Isolator removes noise coming from a noisy appliance connected to the home wiring.

Figure 2:
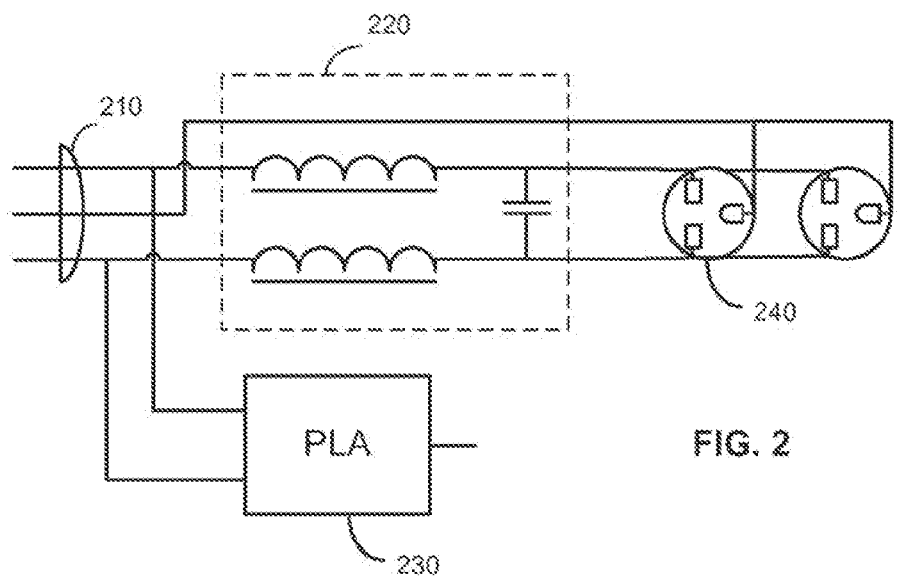
FIG. 2 is a simplified schematic that shows an isolation filter (Isolator) and outlets coupled to a PLA.
Figure 3:
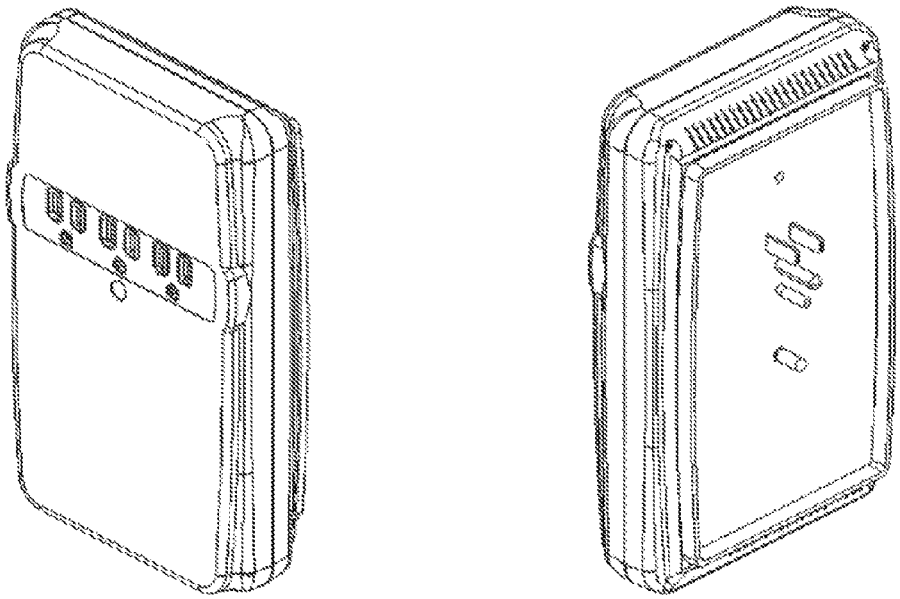
FIGS. 3 and 4 are front and rear isometric views of two embodiments of enclosures housing a combination of an isolation filter, outlets and a PLA.
Figure 4:
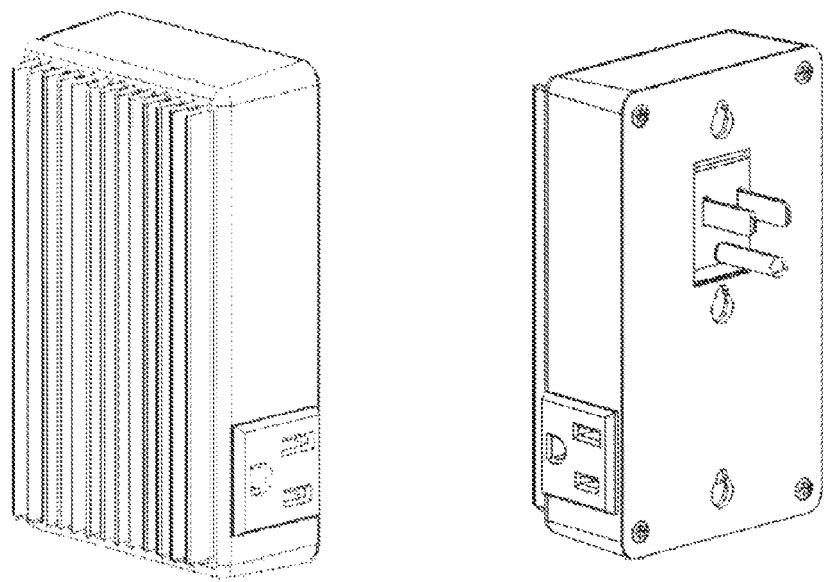
Figure 5:
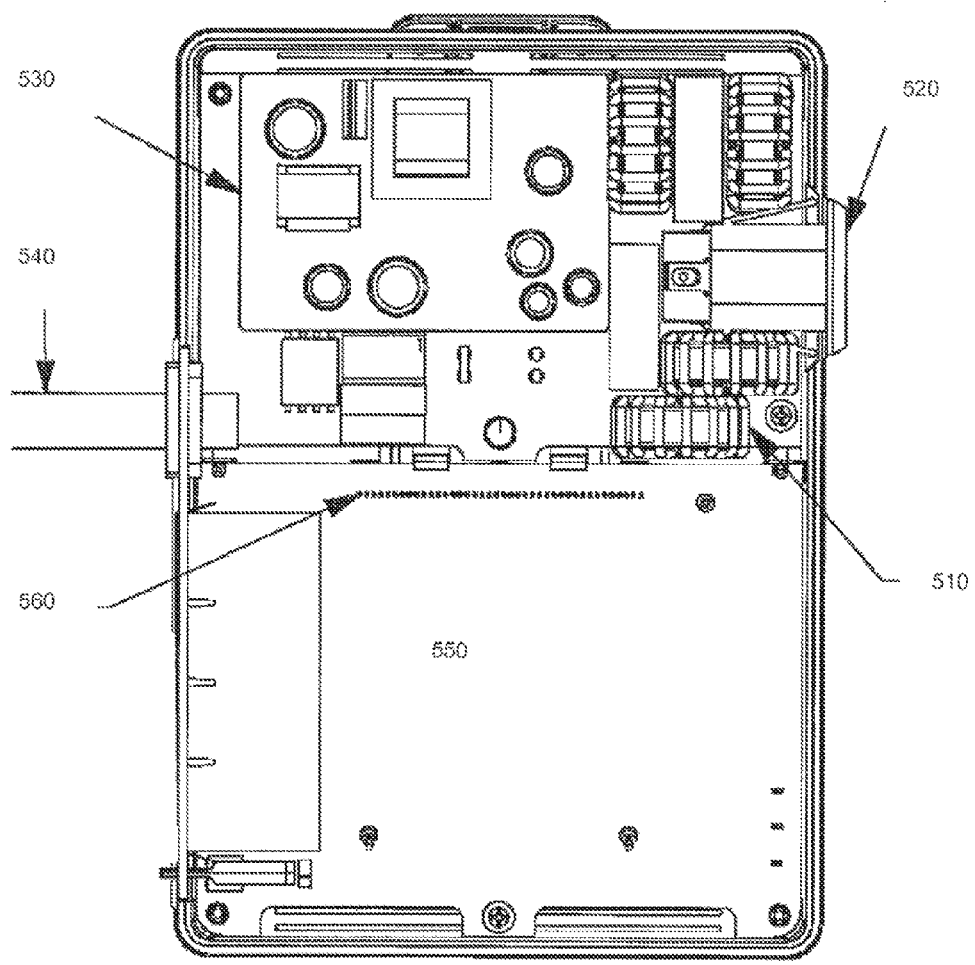
FIG. 5 is a cutaway view of an embodiment that combines an isolation filter, and outlet and a PLA.

FIGS. 3-4 depict alternative enclosures that physically cover both outlets of a dual wall socket. One or more output electrical sockets 240 are connected 210 to the power line via a protective Isolator filter, as illustrated in FIG. 2. This filter 220 is designed to operate at the frequencies used by the PLA 230 and, in this embodiment, handles a load of up to 15 amps. This load allows a user to safely plug in a computer and power strips without impairing the PLA performance. The enclosure includes an electrical plug that fits into one receptacle of the dual electrical wall socket. The electrical plug is connected to a first terminal of one or more inductive elements. The inductive element presents high impedance to carrier currents in the approximate frequency range of 0.6 to 30 MHz. The Isolator can be as simple as a wire inductor with an inductance on the order of 1 to 5 or more Micro henries. The table below shows useful impedances in the frequency range of interest in terms of inductive reactance in ohms.

|        | 1 Micro henries | 5 Micro henries |
|--------|-----------------|-----------------|
| 2 MHZ  | 25.1            | 125.5           |
| 4 MHz  | 50.2            | 251.0           |
| 8 MHz  | 100.5           | 502.5           |
| 16 MHz | 200.1           | 1000.           |
| 32 MHz | 400.2           | 2001            |

In an Isolator, the second terminal of the inductive element is connected to one side of at least one output electrical socket mounted on the surface of the enclosure.

Figure 6A:
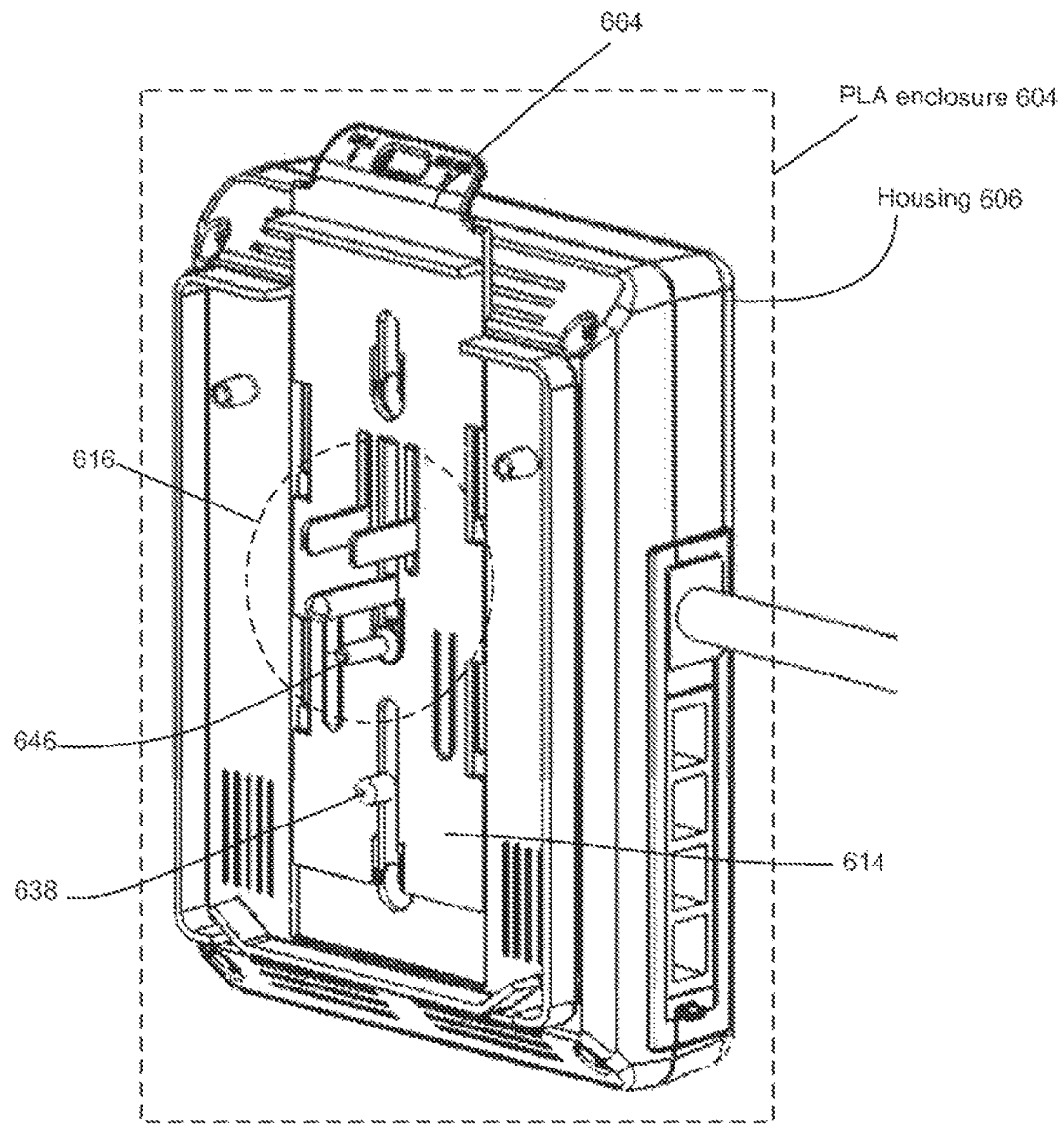
FIG. 6A is a view of similar to that of FIG. 6 with the mounting plate in an install orientation.

As mentioned above it is important that when an electrical outlet 600 includes two or more wall sockets 240, 602, see FIG. 6B, other electrical devices that may create interference with the PLA not plugged into the unused wall socket. One way of helping to achieve this is through the use of PLA enclosure 604. Enclosure 604 includes housing 606 having a back 608 and a number of receptacles 610 for receipt of one or more lines 612. Enclosure 604 also includes a mounting plate 614 slideably mounted to back 608 for movement between a use orientation, shown in FIG. 6 and an install orientation, shown in FIG. 6A. Housing 606 also includes an electrical plug 616 extending from back 608. Plug 616 includes blades 618 and ground pin 620. Blades 618 and ground pin 620 extend through cutouts 622 in mounting plate 614 so not to hinder the movement of mounting plate 614 between the use and install orientations.

PLA enclosure 604 is typically mounted to electrical outlet 600 with the conventional cover plate, typically used to cover the opening 624 created for the electrical outlet, removed. However, PLA enclosure 604 could also be configured for use when a conventional cover plate is used to cover electrical outlet 600.

Mounting plate 614 has, in this example, three mounting slots 626, 627, 628. Mounting slots 626, 628 are used when electrical outlet 600 uses two cover plate mounting screws 630, shown in broken lines in FIG. 6B, while mounting slot 627 is used when electrical outlet 600 uses a single, central cover plate mounting screw 632. Mounting slots 626, 627 and 628 are straight. The mounting slots each include an enlarged portion 634 and a narrower portion 636; see FIG. 6C. The mounting slots could also have other shapes to accommodate different directions of movement of mounting plate 614 between the use and install orientations and could have enlarged portion 634 at different positions along the slot. The narrower portion 636 of mounting slot 627 is seen to merge into slot 622. Similarly, mounting slot 626 has an extended length to accommodate an alignment pin 638, discussed below, which extends from back 608 of the housing 606, during the movement of mounting plate 614.

To mount PLA enclosure 604 to electrical outlet 600, mounting plate 614 is placed in the install orientation of FIG. 6A. Plug 616 is then plugged into the upper wall socket 602 of FIG. 6B with blades 618 entering the blade openings 640 and ground pin 620 a entering pin opening 642 of wall socket 602. During this insertion, the head 644 of cover plate mounting screw 646, which has been positioned to extend an appropriate distance outwardly, passes into enlarged portion 634 of mounting slot 627 and alignment pin 638 passes into opening 642 of the lower wall socket 602. The user then slides mounting plate 614 downwardly to cause head 644 of mounting screw 646 to move into the narrower portion 636 of slot 627 thus effectively securing PLA enclosure 604 to electrical outlet 600. This positioning of mounting screw 646 within narrow portion 636 is shown in FIG. 6.

In some examples it may be desired to use a replacement mounting screw 650 as shown in FIG. 6D. Mounting screw 650 includes a threaded end 652 and a head end 654. Head end 654 includes an outer larger diameter region 656, an inner larger diameter region 658 and a smaller diameter region 660 there between. Replacement mounting screw 650 helps to ensure a snug, secure attachment between mounting plate 614 and the mounting screw.

In some examples it is desired that when mounting plate 614 is in the use orientation of FIG. 6, that removal of PLA enclosure 604 be at least hindered or made somewhat difficult. In the example of FIG. 6 mounting plate 614 has an end portion 664 configured to lie adjacent to a recessed portion 666 of housing 606. While with some examples it may be possible to grasp and pull end portion 664 upwardly to the install orientation, at which point the head(s) of the mounting screw(s) will be within the enlarged portion(s) 634 of the mounting slot(s) permitting removal of PLA enclosure 604 from electrical outlet 600, in other examples doing so may require the use of a tool of some sort. This may be especially beneficial to help prevent the removal of PLA enclosure 604 by small children or the inadvertent removal of PLA enclosure 604 by others. Other techniques for effectively preventing or hindering the movement of mounting plate 614 to the installation orientation of FIG. 6A may be used.

A second terminal directly connects the wall socket to the second output of the electrical socket mounted on the enclosure.

Alternatively, a short cable with the plug 240, 602 can connect the wall socket to the enclosure and a child protective plastic socket cover can be used to block the unused portion of the dual outlet. This will prevent noisy or attenuating connections from being made.

Remote Diagnostics

In a continuous diagnostics configuration, the Uberbox is constantly looking for devices that cause noise. Every noise source will have a signature in time and frequency. The processor in the Uberbox may analyze the frequency spectrum in the impaired direction. Or it might transmit data to a remote site for analysis. Different noise sources tend to have different spectra, across the approximately 1500 tones in the 0.6 to 30 MHz spectrum used for OFDM signals by HomePlug AV PLA. Spectral analysis can provide a secondary clue as to the type of noise and its general location, as do start and stop times for noise. Continuous monitoring can identify when performance drops and when it returns to normal. A change in noise level is generally associated with an appliance turning on and off or being plugged into a wall outlet.

A third party performing ongoing remote diagnostics relieves the user of having to understand the implications of tests that the Uberbox can conduct. Transmitting the data to a remote site allows intelligent systems or experts in the performance of systems to unravel the data. At least some home communications networks will be remotely monitored by a diagnostic center, which receives data via the Internet. The diagnostics data center is capable of detecting operational abnormalities within nodes. The data provided may include the amplitude and signal-to-noise ratio for each carrier frequency in the OFDM spectrum.

Background tests can also be initiated remotely by the diagnostic center as needed and guidance provided to the end user as to the existence of a new or continual source of noise. If a significant impairment is detected, an e-mail can be sent to the home network owner noting that a reduction in performance was spotted. The diagnostic system can report the likely location of the problem, the type of device possibly causing the performance problem and times when the impairments started and stopped. The notice e-mail may offer the user further help from diagnostic center, either in the form of an intelligent system or an expert. An appointment can be made or the diagnostic center can be on standby for assistance calls. To confirm remote diagnosis, the diagnostic center may ask the homeowner to turn off a potential noise source, unplug it or use an Isolator between the device and the wall outlet.

A sophisticated user could be offered the alternative of directing diagnostic traffic to a device in the home, such as an owned laptop or desktop or a rented device, which has been loaded with diagnostic software. As a second diagnostic level for problems not resolved by using the diagnostic software could be escalated to the remote diagnostic center.

Additional Detail of Diagnostic Capabilities

An Isolator unit can be used as a test device. Instead of turning off devices plugged into nearby sockets, the corrective recommendation would be for the user to plug the Isolator onto the end of the line cord of the suspected device. If an improvement is noted, the user would be informed. This method of testing provides a convenient way for the user to understand the effectiveness of Isolators and would lead to online purchase of additional Isolator units as needed. The Isolator units could be shipped and charged against a stored credit card number that is being used to pay for continuous monitoring of the home network.

Weak phase coupling also can be spotted by an Uberbox. Houses in the United States are generally wired as 120-0-120 volts to allow larger appliances to operate on 240 V. There are two separate 120 V circuits with the phase difference. Carrier signals are capacitively coupled from one phase to the other via the incidental capacitive coupling of the two 120 volt lines twisted together from the power pole to the house. While inadequate phase coupling is not typically a problem in the 0.6+MHz range, there can be no guarantee that coupling will in all cases be ideal or adequate for PLAs on one phase speaking to PLAs on another phase. The Uberbox contains a phase measuring capability so that phase coupling problems between the two separate 120 V circuits can be evaluated and reported, either by the remote diagnostic center or software run locally on the home network that evaluates data from the Uberbox.

Noise from outside the home network also can be spotted. Unwanted signals can enter from adjacent houses via the power line. These signals typically will be significantly reduced in magnitude and usually will not interfere. As each house uses different cryptographic keys, private data would not be compromised. In the course of tracking down noise source impairment on the home network, pinpointing noise as originating outside the home network is useful. Comparing the noise signature at multiple points, one closer to the power entry and at least one point further away the entry can suggest an outside source as the culprit.

Interference between incompatible powerline adapters, such as DS2 adapters made in Spain versus Intellon's AV product can be detected by spectral analysis. The DS2 company introduced its chip and product, claiming to have a raw data speed of 200 MHz, prior to finalization of the standard for Intellon's introduction of the HomePlug AV product. As a result, many DS2 units are installed. Unfortunately, DS2 and Intellon did not coordinate their signal spectrum assessment. Therefore, DS2 devices can appear as major noise sources on a HomePlug network. By comparing the expected spectrum of the DS2 with the received spectrum at an enhanced powerline adapter, the presence of this noise source can be diagnosed.

Electrical device power consumption signatures can be identified. A number of papers have been written by researchers at MIT evaluating data that indicates which electrical appliances were on or off when monitoring current flow through an electric meter. The papers address power consumption of different devices by recording total consumption and then determining which power devices turn on or off at any instant to determine true power usage. Equipping the Uberbox with components to monitor electric consumption and conducting interactive, software-guided device activation and deactivation can inform the user regarding home power consumption.

As described, the ideal theoretical location of an Uberbox is within the first circuit breaker box, which is connected to the existing electric meter. A benefit of this location is that in one embodiment current sensors could be added to the house power line and connect to a version of the Uberbox that would also measure electrical consumption data in real time. This would also require the addition of an electric metering chip. These are now made by several manufacturers. One such representative chip would be the ADE7753 by Analog Devices. This arrangement is not intended to eliminate the revenue meter owned by the electric utility. Rather it would provide a real time measurement needed for energy saving without requiring electric utility approval. By turning appliances on and off, the homeowner can learn about the cost of operating appliances. Studies show that this leads to electricity usage reduction.

Different Isolator packaging would be used for devices plugged into the wall, as distinct from those permanently wired. Permanently wired noise sources can usually be spotted by turning a wall switch on and off. Isolating noise caused by permanently wired devices may require an electrician to install an Isolator filtering device, as these units would likely have wire leads, in lieu of a simple plug and socket arrangement. Most houses are wired with separate circuits for lights and floor outlets with wire runs to the breaker box for permanent lighting. This arrangement tends to provide sufficient attenuation of noise to minimize interference. Large electric motors of appliances such as dishwashers, refrigerators and washing machines are usually connected with plugs and, therefore, can be handled by user installed plug-in Isolators.

While only a single Uberbox is needed in a network of conventional PLAs, it is helpful to use two Uberboxes. Having a pair of Uberboxes allows diagnosis by exchanging the position of the units. A significant difference in performance when the location of the units is swapped can be diagnosed as a defective unit.

An additional benefit of having two Uberboxes is that they can be connected to two different metropolitan network gate-ways using different media, such as DSL and cable modem, to provide redundantly reliable monitoring, for instance in the case of medical or geriatric monitoring.

When there is only a single Uberbox, a preferred mounting location for the Uberbox is close to the incoming powerline breaker box.

It should be recognized that the analysis of data can be performed either by humans or intelligence systems. The diagnostic functions described in this disclosure are fundamentally deterministic. A tree diagram can be drawn to illustrate a diagnostic protocol. While some forms of diagnostics require interaction between the user and data collection, this can be automated via a website or conducted with a live expert at a time of convenience chosen by the user.

Results of Prototype Testing

Test Environment

Early prototypes of the Uberbox were tested in a one-story rambling 60 year old house having a mixture of various vintages of knob and tube wiring plus more recent wiring. The house had two breaker boxes, presenting a more challenging environment than the average house. A second set of tests were run in a one-story, 13,800 square feet commercial building with multiple small tenant offices. Offices generally housed one or more small computer systems.

In the second test, five networks were constructed. Network 1 used an Uberbox to couple an Ethernet connection to the building wiring the building's electrical wiring. Network 2 connected three computers located at different points around the building each with their own Uberboxes. Network 3 used a power over Ethernet (PoE) type Uberbox to reach a WiFi access point to reach multiple lap top computers in the building. Network 4 used a PoE type Uberbox to connect an MPEG-4 camera to the network. Network 5, was a cluster of four commercially available HomePlug AV units (not Uberboxes) using coaxial cable in lieu of the power lines to observe operation in an essentially noise free environment.

Results of Test

The preliminary gross verification of principles tests were successful. The larger the house and more breaker boxes, the greater the challenge and the payoff for repeating could be seen.

In the 13,800 sq. ft. office building seven of eight Uberboxes plugged into readily accessible sockets were able to see one another throughout the building and produced acceptable data rates. One socket was not "visible" from one or more other sockets. This was overcome using a two hop connection.

There is a fundamental limitation on using a repeater, because HomePlug shares a single common spectrum among all devices. Therefore, the spectrum capacity must be divided among the devices attempting repeating. An intelligent computer worked significantly better in relaying operation than operating a pair of off the shelf HomePlug AV PLAs connected together to form a relay.

Flow Chart

Figure 7:
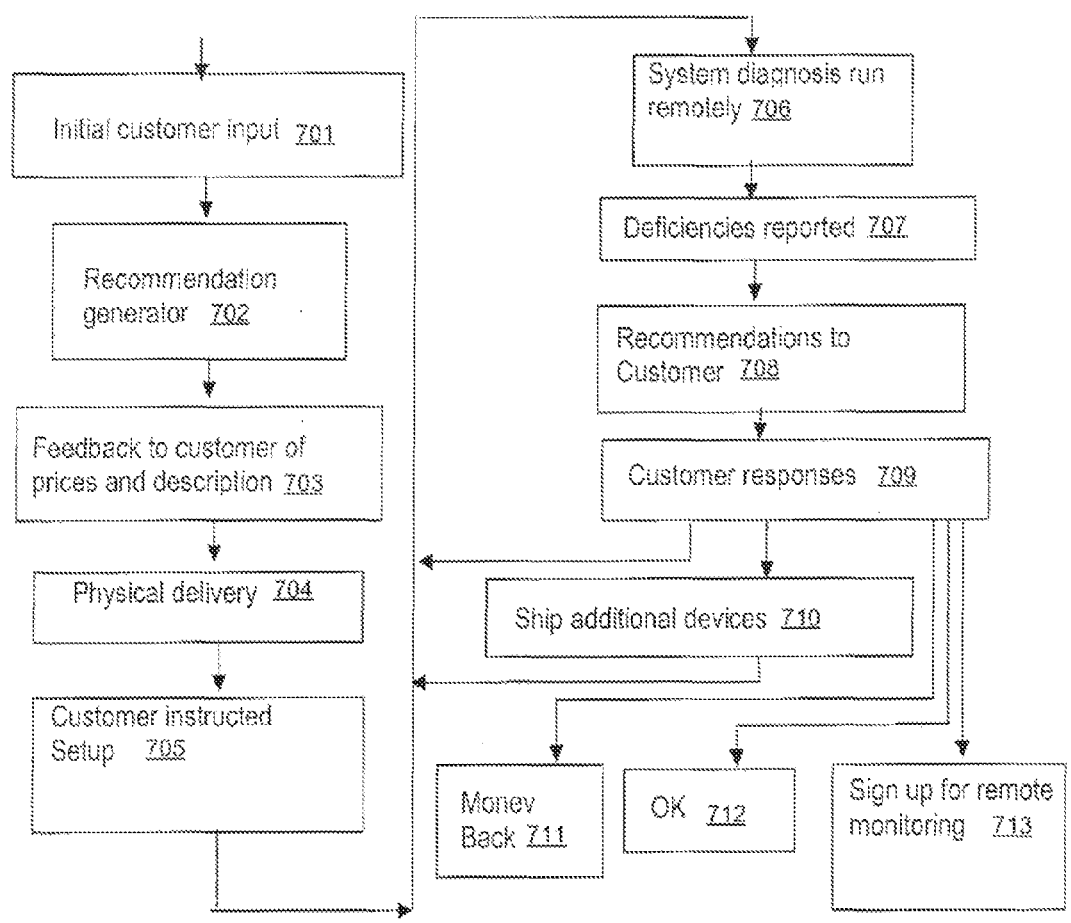
FIG. 7 is a flow chart from initial customer input, through procurement, troubleshooting and resolution.
Figure 8:
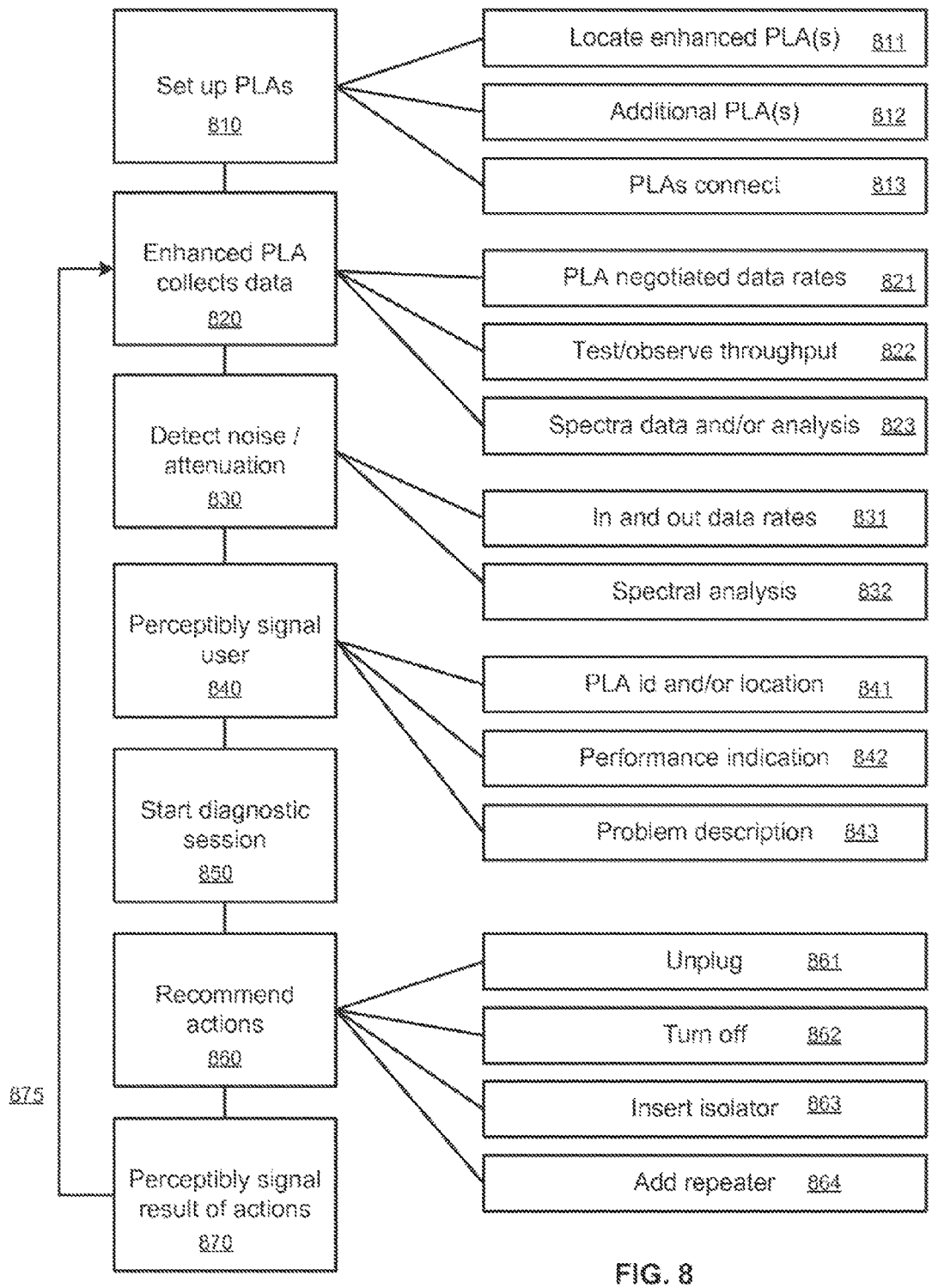
FIG. 8 is a flow chart for set up of the PLAs through diagnosis, with options or subsets in the right-hand column.
Figure 9:
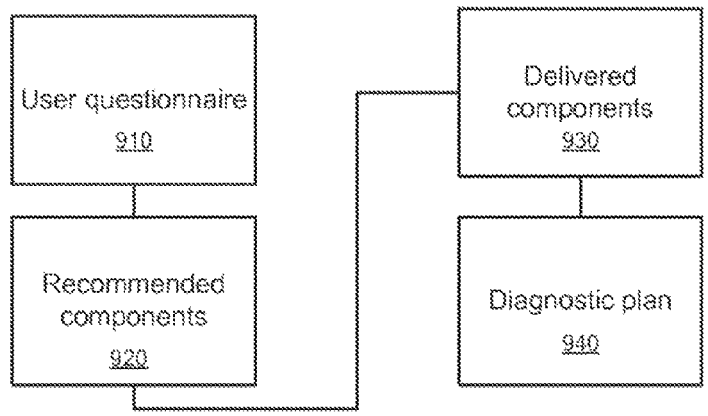
FIG. 9 is a flow chart of steps that may precede setup of PLAs.
Figure 10:
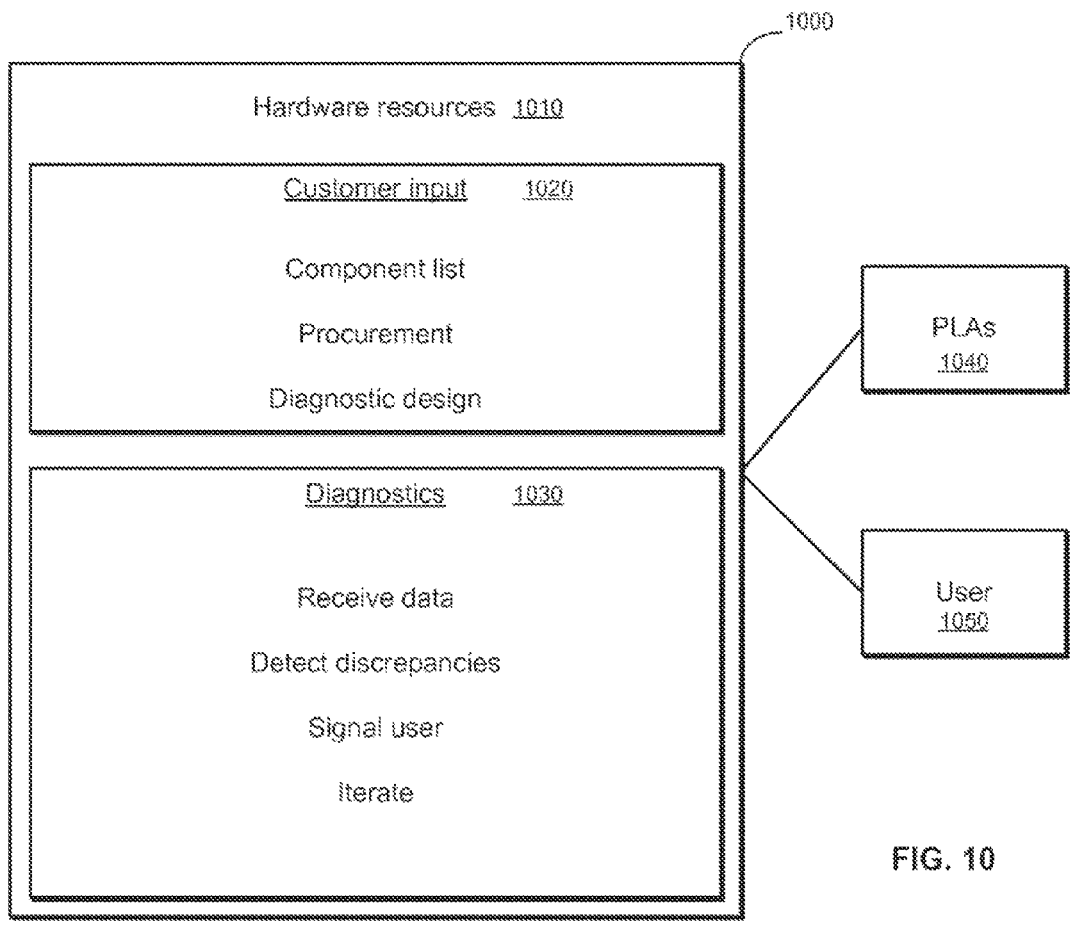
FIG. 10 is a simplified block diagram of a diagnostic device in communication with PLAs and a user.

FIG. 7 is a flowchart that covers both diagnostic and retailing steps starting with a first time user ordering service via the Internet. It should be understood that actions depicted in the flowchart can usefully be grouped in many different ways. It is not necessary to perform all of the steps in the flowchart to take advantage of the technology of this disclosure; the steps can be combined in many ways.

Initial consumer input 701 includes a customer answering questions, preferably filling out an interactive questionnaire. One set of questions includes the number of points that the customer wishes to connect and the data rates desired at the connection points. Another set asks about the number of circuit breaker boxes in the house and the number of circuit breaker levers in each box. It also would ask the approximate distance of the first wall connected outlet socket from each of the breakers. Another set, related to retailing, would inquire about how quickly that user wants to complete network set up, which might determine the method of shipment or whether to send the user to a local retailer.

A recommendation generator 702 judges, based on the number circuit breakers in each box, the likelihood of requiring a repeater near a breaker box. Other components, such as Uberboxes and one or more isolators without powerline adapters may be prepackaged as a starter kit or individually recommended to the user.

The output of the recommendation generator is sent back to the customer 703 in the form of a list of recommended equipment, together with estimated prices and the disclaimer that additional equipment might be needed, depending on the result of initial tests. The user responds by selecting equipment, which is either shipped the user 704 or available from a local retailer. Preferably, a sturdy reusable shipping container is sent to the user, to be re-used in case of returns. Units shipped together will be cryptographically configured to work together without further configuration.

User instructed set up 705 includes plugging units into designated wall sockets. The customer receives the box and a customized web link or logon that connects diagnostics back to the original recommendation.

System diagnostics are established 706 by a network connection with a remote diagnostic center or, optionally, with diagnostic software loaded onto a home computer. In a hybrid approach, initial system diagnostics can be conducted with the remote diagnostic center and continuous monitoring with the computer in the home. Effective data rate and/or spectral analysis can be performed. One or more Uberboxes can perform the analysis with all of the powerline adapters that they can see. Alternatively, pair wise analysis can be performed among all the powerline adapter devices. Evaluation of data rates and/or spectral analysis is used to identify noise and/or attenuation problems. Spectral analysis helps identify likely causes with particularity. The Uberboxes forward data 707 to the diagnostic software.

Recommendations are made to the customer 708. For example, it may be necessary to isolate known noise sources. A suspected device may be turned off, disconnected or coupled through an isolator to the powerline 709. Analysis while the suspected device is isolated would confirm whether the suspicion was correct. Recommendations might include adding a repeater at a trial location, for instance, to span circuit breaker boxes, or adding a WiFi repeater in particularly difficult situations. Additional components 710 can be shipped directly to the user, if time permits, or obtained from a local retailer.

Remote diagnosis also supports return-to-manufacturer authorizations ("RMAs") 711, should troubleshooting fail to enhance performance of the powerline adapter network to an acceptable level.

Long-term monitoring 713 can be performed by a remote diagnostic center or by software loaded onto a home computer. Long-term monitoring can identify intermittent noise sources by the time of day that they operate. It can detect degradation in parts of the network over time. Recommendations and/or assurances to the user can be sent out as needed or on a predetermined schedule.

Some Particular Embodiments

The present invention may be practiced as a method or one or more devices adapted to practice the method. The same method can be viewed from the perspective of a user, an enhanced powerline adapter, diagnostic software running on a node of the same network segment as the enhanced powerline adapters, or a remote diagnostic center interacting with the enhanced powerline adapters. The invention may be an article of manufacture such as media impressed with logic to carry out computer-assisted network diagnostics.

One embodiment is a method of locating a performance problem in a network of powerline adapters connected to power lines in a home to form a home networking system. The method alternatively could be applied to setting up a network of powerline adapters or monitoring the performance of the adapters. In any of these application environments, the method includes electronically collecting 820 in and out data bit rates effective at the PLAs. Because the input rate for one of a pair PLAs is the output rate of the other unit, the enhanced PLA can collect the data desired without collecting both in and out rates from each node. Logic and resources (or hardware and software) incorporated in the PLAs collects the in and out data bit rates in at least two ways. First, the effective data rates can be the negotiated data rates 821. The PLAs negotiate pairwise their allowable data rates. As operating conditions change and bit error rates are observed by the PLAs, the data rates may be renegotiated. A particular PLA advertises the data rate at which it will receive data. Given the negotiation protocol for data rates, the negotiated data rates and bit loading of individual channels may be expressed as a function of measured signal-to-noise ratios. Alternatively, effective data rates can be measured data throughput 822. For instance, a data throughput test can be run. With user agreement, the test can be run on demand. For continuous monitoring, the test preferably is run in the background without interfering with network usage or at a prescheduled time. Or, when significant data flows are part of the network usage, such as copying large files from one device to another, the throughput from actual usage can be measured. Either permitted (negotiated) data rates or actual (measured) data rates can be taken as in and out data bit rates effective at the PLAs.

This method continues with identifying a discrepancy 830 between the in and out data bit rates 831 at a particular PLA as indicating a noise source close to the particular PLA. A discrepancy can be calculated as a ratio of data rates. A discrepancy can be indicated by evaluating a ratio or difference between in and out data rates or by applying other algebraic or bit logic operations on the rate data. The identification of a discrepancy preferably involves an automatic, computer implemented calculation and evaluation.

The method also includes perceptibly signaling a user 840 to correct the noise source at the particular PLA. One perceptible signal described above is an e-mail, which a user reads. Many alternative ways of signaling a user at a computer can be used, such as pop-ups, flashing icons or audible signals. Another perceptible signal could come from an indicator built into the PLA. Depending on the indicator, it could signal for correction of a noise source local to the particular PLA having the indicator 841. Or, it could include a display that identifies the PLA experiencing the noise.

Another embodiment of locating a performance problem in a network of powerline adapters substitutes electronically collecting received Tone Map spectra data 832 from enhanced PLAs for collecting data in and out rates 831. This alternative involves the enhanced PLAs characterizing the spectra that they receive using a spectrum analyzer, which would not be found in a consumer product, commercially available PLA as of 2007. The PLA may analyze the spectra or forward characterization data to diagnostic software for analysis. Analysis of received spectra preferably compares received spectra with expected spectra of a predetermined test sequence. Alternatively, spectra can be analyzed against expected network usage.

This method variation continues with identifying a discrepancy between the received spectra at the particular PLA and a predetermined spectral distribution as indicating a noise source close to the particular PLA. As described above, Tone Map spectra analysis can be extended to identifying, from a spectral signature, one or more types of devices likely to be causing the noise 843. Tone Map spectral analysis also can be applied to evaluating attenuation 842 by devices that use up front capacitors to suppress RF emanations.

As described for the data rate embodiment, the spectral analysis embodiment also includes perceptibly signaling a user to correct the noise source at the particular PLA. Collectively, we refer to these as the first pair of method embodiments.

One aspect of the first pair of method embodiments is interactive, guided trouble shooting 850. A user can interact with a remote diagnostic center or with software running on a node of the same network segment as the PLAs. The interaction includes transmitting the in and out data rates 831 and/or the received spectra data or analysis of the received spectra data 832 from one or more of the PLAs to a computer device running diagnostic software. The method continues 860 with measuring a change in performance using the diagnostic software as the user takes one or more corrective actions 861-864 and perceptibly signaling whether the corrective action has been effective 870. Preferably, the interaction includes suggesting one or more corrective actions for the user to take. These suggestions can be made automatically by software or can be made by staff of a remote diagnostic center based on the transmitted data. The user indicates when the corrective actions have been implemented. Additional data is collected and analyzed. A perceptible signal is generated that indicates whether the corrective action has been effective. Trouble shooting may proceed iteratively, with various corrective actions or combinations of corrective actions.

Yet another embodiment provides a method of locating a noise producer or signal attenuator and recommending installation of an isolation filter 863 to reduce noise or attenuation at a wall socket used to connect the powerline adapter to a powerline in a home to form a home networking system. This method begins with plugging in a first enhanced PLA into a powerline at a first location in home or other building (collectively referred to as "the home"). The enhanced PLA includes basic capabilities to communicate with other PLAs at data rates adapted to noise and attenuation and enhanced testing capabilities to at least forward performance data for diagnostic purposes. Additional PLAs are plugged in. These PLAs may be enhanced or not. The wall sockets that they plug into at additional locations are coupled by power lines in the house to the first PLA.

The first and additional PLAs connect to one another or at least to the first PLA. At least the first PLA collects 820 effective bit rates 821-822 for communication with the additional PLAs, and at least the first PLA forwards the effective bit rates data, for instance, via the Internet, to a remote diagnostics center. The user receives a report from the remote diagnostic center that includes at least recommendations to correct performance deficiencies in communications among the PLAs, as indicated by discrepancies in the data bit rates. The report also may include qualitative or quantitative descriptions of performance 842 of the first and additional PLAs.

Any of the foregoing method embodiments may further include a user accessing the website and establishing a test plan 850, 940 for coupling the additional PLAs to the power lines at the additional locations. Optionally, unique identifiers of the PLAs, such as MAC addresses, would be associated with descriptive names assigned by the user. Preferably, evaluation of PLA performance could be conducted during the same session. The report received by the user from the remote diagnostic center would include qualitative or quantitative descriptions of performance 842 of the first and additional PLAs. If the user assigned names, the report would use those names.

The foregoing method embodiments may further include provisioning the home powerline network in an interactive session with the user. The user accesses the website 910 and provides counts of circuit boxes, breakers in the circuit boxes and PLA connections to be supported. The desired data rates or usage type for the PLA connections optionally may be supplied. The user receives from the website a list of recommended components 920 to be used in the home powerline network. These components may be purchased by the user from the operator of the website 930 or at a local retail outlet.

Remote diagnostic efforts may be iterative 875. The user may implement at least some of the recommendations received 860 and the home network may interact with the website or other diagnostic system to repeat the actions of determining effective bit rates, forwarding the effective bit rates and receiving a report.

A further method embodiment, which may be combined with other aspects described above, is for another method of diagnosing whether to install an isolator 863 or take other steps 861, 862, 864 to reduce noise at an outlet used to connect the powerline adapter to a power line in a home. This method includes coupling a first enhanced PLA into a power line 811 at a first premises location, wherein the enhanced PLA includes basic capabilities to negotiate asymmetrical OFDM data exchanges with other PLAs and enhanced capabilities to at least forward the negotiated data exchange rates. The method includes coupling a second PLA to a power line 812 at one or more additional premises locations that are coupled by the power line to the first PLA 813. The first PLA forwards at least the negotiated data exchange rates between the first and second PLA to an evaluation component 830. The user receives and, in at least some cases of asymmetry between the negotiated data exchange rates, a perceptible signal 840 that alerts the user that the noise has been detected at one of the PLAs and that corrective action should be taken.

As previously described, the evaluation component 830 may be off-premises and data forwarded, for instance, via the Internet. Then, the user receives an e-mail message or other communication from the off-premises evaluation component with a recommendation for corrective steps to be taken.

This further method embodiment may be combined with the website access, with the testing plan, or with the website recommended components list aspects of prior embodiments.

Any of the foregoing method embodiments may be extended by establishing a test plan that includes coupling one or more enhanced PLAs to power lines near one or more circuit boxes 811. Or, they may be enhanced by forwarding the effective data bit rates repeatedly over a period of hours or weekly so that the user may receive reports that include times of day when noise sources appeared and abated. Detection of noise sources by discrepancies between in and out data bit rates 831 can be combined with spectral analysis 832. Spectral analysis permits the reports received by the user to address both likely device types causing noise on the powerline and excessive attenuation due to certain devices being plugged to a socket very close to the socket used for the PLA. The spectral analysis also permits the reports received by the user to identify incompatible PLAs that create noise and that fail to exchange data with the first enhanced PLA. Historical data and spectral analysis can be used separately or combined to enhance noise detection capabilities.

Each of the methods described above can be recast from the perspective of the remote diagnostic center or diagnostic software system that interacts with the first PLA. The first pair of method embodiments corresponds to a pair of device embodiments. These diagnostic device embodiments include software running on a computer device 1000 that is in communication with at least one enhanced PLA 1040. In this context, a computer device may include a wide range of logic processing devices 1010, such as ASIC or RISC processors, digital signal processors, gate arrays or custom processors. The logic and resources of the diagnostic device 1030 are adapted to receive data electronically collected by the enhanced PLA and to analyze the data to identify a discrepancy as indicating a noise source close to a particular PLA. The identity of the particular PLA is received from the enhanced PLA. The logic and resources may identify a discrepancy based on differences between in and out data bit rates at a particular PLA or a difference between the Tone Map received spectra at the particular PLA and a predetermined spectral distribution. The logic and resources are adapted to perceptibly signal the user 1050 to correct the noise source at the particular PLA. The signal may be an e-mail or message displayed during an interactive session with a website, or it may take any of the other forms described above.

The diagnostic device may further include logic and resources to continuously or repeatedly receive data electronically collected from the enhanced PLA. It may receive this data electronically over a period of hours, days, weeks, etc. The data received over time can be used to establish a pattern of noise sources that intermittently appear and disappear or to protect against degradation of the network.

The diagnostic device may interact with the user 1050, make specific corrective recommendations and perceptibly signal the user as to whether the corrective actions are effective.

The diagnostic device may be linked to a procurement website that interacts with the user to collect data 1020 about user requirements and provide the user with a list of recommended components. The procurement website may sell the components to the user and arrange for fulfillment. The user interaction with the procurement website 1020 is recorded and available for use by the diagnostic device 1030.

An alternative description of a diagnostic system that applies the methods described above is as a remote diagnostic center that generates recommendations to improve performance of the home networking system. The home networking system includes a plurality of powerline adapters plugged into wall sockets in a home or other building and coupled to the remote diagnostic center by a network. The diagnostic system 1000 includes an initial customer input component 1020, hosted on a server 1010, adapted to receive input from the user. The input received from the user includes at least the number of network connections via PLA required, including data rates of the connections and a description of circuit breaker boxes in the home, including the number of circuit breakers in each box. The initial customer input component is further adapted to provide the user with a diagnostic plan for locating the PLAs, including at least one enhanced PLA that includes basic capabilities to communicate with other PLAs at data rates adapted to noise attenuation and enhanced testing capabilities to at least forward performance data for diagnostic purposes.

The diagnostic system further includes a system diagnosis component 1030, hosted on a server 1010 and having access to the diagnostic plan 1020. The system diagnosis component is adapted to receive a connection request from the enhanced PLA. It is further adapted to monitor and receive data according to the diagnostic plan that describes performance of communications among the PLAs. It is adapted to report recommendations perceptibly to a user. The recommendations are for correcting performance deficiencies in the communications among the PLAs.

The system diagnosis component may be further adapted to receive the data rates and received spectra data from at least the enhanced PLA. This component distinguishes between noise and attenuation problems and makes recommendations to the user based on analysis of the bit data rates and received spectra data.

The system diagnosis component may be further adapted to request that the user alternatively unplug a device, turn off the device or insert an isolation filter between the device and a wall socket, in order to diagnose any noise generated by the device. The system diagnosis component may use any of the three approaches to isolating the device from a wall socket. Preferably, an isolation filter is inserted, because that demonstrates to the user the effectiveness of the isolation filter, which may be a more practical approach than discontinuing use of the device. The system diagnosis component is further adapted to monitor and receive data and evaluate the effectiveness of the user implementing the request.

A further group of embodiments are machine readable media impressed with source or object code that implements any of the methods above or that can be combined with a computer to form any of the devices above. The machine readable media may be a rotating media or a solid-state media. It may be a buffer into which a data stream is received. By machine readable media, we mean to include, to the extent permitted by patent law, manufacturing a machine readable media impressed with source or object code transmitting a data stream to a buffer with the intent that the data stream will be persisted and will include in source or object code that implements any of the methods above or they can be combined with a computer to form any of the devices above.

Applications

Low-cost setup and diagnosis of powerline adapter networks may enable a variety of applications not hitherto practical. For example, there is a need for reliably established networks in mall retail stores. The requirements for this application include for instance, digital high-resolution color cameras using power over Ethernet ("PoE"). Such networks could support electric power monitoring, data transmission, virtual PBX telephone services and alarm monitoring for retail outlets. In a wide variety of businesses, electric cost reduction could be achieved by combining power monitoring with powerline adapters. Power monitoring devices could be built with or without isolation filters and with or without Ethernet adapters. The power monitor would sense that the appliance connected to it was being turned on and measure the power consumption. This would be particularly effective in California, which has a very high progressive usage tariff and is considering time of day tariffs. Japan's EPRI estimates that a 15 percent reduction in power usage could be achieved by users who are aware of actual power consumption throughout their building. In hot and cold climates, heating and cooling cost reductions could be achieved. The home power system could be a more effective way of retrofitting buildings with multiple thermostats and room temperature controls than wirelessly connected units. In buildings where multiple telephone outlets are desired, existing telephones could be plugged into the nearest wall socket with the powerline adapter translating the phone signals to an appropriate protocol. For instance, the powerline adapter could convert analog signals to voice over IP ("VOIP") signals and route them to a carrier. Or, the powerline adapter could convert analog signals to a format compatible with an in-home PBX or an in-home adapter to a plain old telephone system ("POTS") analog phone line. In buildings with televisions, powerline adapters could deliver television over IP ("IPTV") to IP enabled devices at data rates adequate to support HDTV. Another application indicative of those that require a more reliable network than possible with wi-fi and existing PLA networks would be the in-home monitoring of patients, particularly aged patients, enabled by low-cost devices placed throughout the home. It is estimated that 95 percent of the elderly desire to remain in their home as long as possible. Remote television cameras and speakerphones coupled with motion detectors and conveniently located panic buttons have been proposed. A reliable and remotely monitored network could be safe enough for health-related applications.

While the present invention is disclosed by reference to the preferred embodiments and examples detailed above, it is understood that these examples are intended in an illustrative rather than in a limiting sense. Computer-assisted processing is implicated in the described embodiments. It is contemplated that modifications and combinations will readily occur to those skilled in the art, which modifications and combinations will be within the spirit of the invention and the scope of the following claims.

What is claimed:

1. A computerized method performed by a processor of locating a performance problem in a network of powerline adapters (abbreviated "PLAs") connected to power lines in a home to form a home networking system, the method comprising:
   electronically collecting in and out data bit rates effective at the PLAs;
   identifying a discrepancy between the in and out data bit rates at a particular PLA that indicates a noise source close to the particular PLA; and
   electronically signaling a user to correct the noise source.

2. The method of claim 1, further comprising transmitting the in and out data bit rates from one or more of the PLAs to a computer running diagnostic software;
   measuring a change in performance using the diagnostic software as the user takes one or more corrective actions; and
   electronically signaling to the user whether the corrective action has been effective.

3. The method of claim 1, wherein the data bit rate effective at the particular PLA is an in data bit rate set by the particular PLA.

4. The method of claim 1, wherein the data bit rate effective at the particular PLA is a measured data bit rate.

5. A computerized method performed by a processor of locating a performance problem in a network of enhanced powerline adapters (abbreviated "PLAs") connected to power lines in a home to form a home networking system, the method comprising:
   electronically collecting received spectra data from the enhanced PLAs;
   identifying a discrepancy between the received spectra data at a particular enhanced PLA and a predetermined spectral distribution as indicating a noise source close to the particular enhanced PLA; and
   electronically signaling a user to correct the noise source close to the particular enhanced PLA.

6. The method of claim 5, further comprising transmitting the received spectra data from one or more of the enhanced PLAs to a computer device running diagnostic software;
    measuring a change in performance using the diagnostic software as the user takes one or more corrective actions and electronically signaling whether the corrective action has been effective.

7. The method of claim 5, wherein the received spectra data measures reception of a known test signal sent to the particular enhanced PLA.

8. The method of claim 5, wherein the received spectra data measures reception of general network traffic received by the particular enhanced PLA.

\* \* \* \* \*